United States Patent [19]
Daoud

[11] Patent Number: 6,073,890
[45] Date of Patent: Jun. 13, 2000

[54] STRAIN RELIEF MECHANISM AND METHOD

[75] Inventor: Bassel Hage Daoud, Parsippany, N.J.

[73] Assignee: Lucent Technologies Inc., Murray Hill, N.J.

[21] Appl. No.: 09/045,169

[22] Filed: Mar. 19, 1998

[51] Int. Cl.[7] ............................................. F16L 5/00
[52] U.S. Cl. ................................ 248/56; 174/153 G
[58] Field of Search ............................... 248/56, 523, 71, 248/74.1, 74.2, 74.3, 539, 315, 316.1, 560; 439/453; 174/70 R, 153

[56] References Cited

U.S. PATENT DOCUMENTS

| | | | |
|---|---|---|---|
| 2,375,373 | 5/1945 | Leathers | 174/153 G |
| 3,056,852 | 10/1962 | Sachs | 174/153 G |
| 4,385,777 | 5/1983 | Logsdon | 285/12 |
| 4,685,173 | 8/1987 | Pavur | 16/2.5 |
| 4,773,279 | 9/1988 | Spease | 248/56 X |
| 5,526,549 | 6/1996 | Mori et al. | 174/153 G |

*Primary Examiner*—Leslie A. Braun
*Assistant Examiner*—Gwendolyn Baxter

[57] ABSTRACT

A bracket includes a mounting flange for mounting the bracket to a structure, an elastically deformable, cable-retaining member for engaging a cable passing therethrough, and a plurality of arms connecting the flange to the member for permitting the cable to pass through the member in a first direction, but for preventing the cable from being withdrawn from the ring in a direction substantially opposite the first direction.

20 Claims, 3 Drawing Sheets

STRAIN RELIEF MECHANISM AND METHOD

FIELD OF THE INVENTION

This invention relates to a mechanism for securing and strain relieving an electrical cable, conduit, hose or the like, that must pass through and/or be retained in an orifice in a wall or other structure, and a method of using same.

BACKGROUND OF THE INVENTION

Junction boxes have long been used to collect and protect telephone and electrical wires for distribution, splicing, cross connection and other uses. In the telephony arts, such junction boxes are more commonly known as network interface units (NIUs) and/or building entrance protectors (BEPs).

Generally, BEPs consist of a sheet metal or plastic housing with at least one orifice through which an electrical conduit or cable is passed. To prevent the terminated wires from exposure to loads or stresses exerted upon the cable, the cable is strain-relieved at the point where it enters the housing wall. Where the cable contains additional wires that are to be terminated elsewhere, the cable is fed through a second orifice to a second housing.

Depending on the design of the building, BEPs may be stacked one above the other or spaced apart over relatively great distances. As such, one problem encountered when laying a cable to and between BEPs is that to position the cable within the BEP housing, the cable must be fed or "pulled" through the BEP orifices. This exercise can be extremely labor-intensive, as the weight of the cable must be supported to permit the free end of the cable to be maneuvered through the BEP orifice, while not permitting the cable to slip back out again. Further, when a cable is fed through a BEP orifice, extra care must be taken not to damage the cable insulation as it is pulled through the orifice. Once pulled as desired, the cable must then be retained or secured to the BEP or junction box using a strain relief, which requires screwing a bracket over the cable, or securing cable ties or clamps or other known devices to and around the cable. Moreover, prior to such securement, the cable must often be wrapped in a fire retardant sheath to prevent fire originating in the box from leaving the box. As a result, feeding a cable through and securing it within an orifice is a labor intensive task that increases the amount of time and cost required to properly lay cable.

An additional problem encountered when laying cable is that the diameter of the cable varies depending upon the number of wires required to be terminated at any location. As such, depending on the cable diameter, different methods or products are used to strain-relieve and seal the cable, requiring a significant inventory of various strain relief devices.

It would therefore be advantageous for an apparatus or method to be developed which would alleviate the above-identified shortcomings of the prior art.

SUMMARY OF THE INVENTION

The cable bracket of the present invention is directed at overcoming the shortcomings of the prior art. The bracket generally comprises an outer mounting flange for mounting the bracket to a structure surrounding the orifice through which a cable will be passed, an elastically deformable, cable-retaining ring for engaging a cable passing therethrough, and a plurality of arms connecting the flange to the ring for permitting passage of the cable through the ring in a first direction, while preventing the cable form being withdrawn from the ring.

In a preferred embodiment, the retaining ring is substantially circular and conformingly engages a cable passing through it. Further, the arms are uniformly spaced radially about the retaining ring. To seal a housing using the bracket, the bracket can include a membrane that connects the flange to the retaining ring and fills the space between the flange and the retaining ring. Preferably, the membrane consists of or is formed of a fire-retardant material which, in conjunction with the retaining ring and/or flange, creates a fire-retardant seal to help contain a fire or smoke condition within the housing to which the bracket is mounted.

To use a cable bracket of the present invention for securing a cable passing through an orifice, the bracket is preferably mounted to a structure containing the orifice in such a manner that the orifice is substantially, although not necessarily, concentric with the retaining ring. A cable is then passed through the orifice and the retaining ring in a first direction. When the cable is loaded or pulled in a direction substantially opposite the first direction, the arms engage the cable and prevent the cable from being withdrawn from the bracket in a direction opposite the first direction. The arms may be removable, thereby permitting bi-directional movement of the cable prior to insertion of the arms.

In this manner, the method of installing the cable is simplified as the installer can pass the cable through the bracket without damaging the cable, since the cable is isolated from the edges of the orifice by the retaining ring. With the arms in place, the bracket therefore serves to strain-relieve the cable so that, when the cable is subjected to force, wires that are broken out from the cable and terminated within the housing are not pulled from their termination points. In addition, by providing an expandable retaining ring that flexibly conforms to various cable diameters, the bracket may accommodate cables of widely different diameters. This greatly increases installation flexibility, as one bracket may be provided for an entire range of cable diameters.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1:
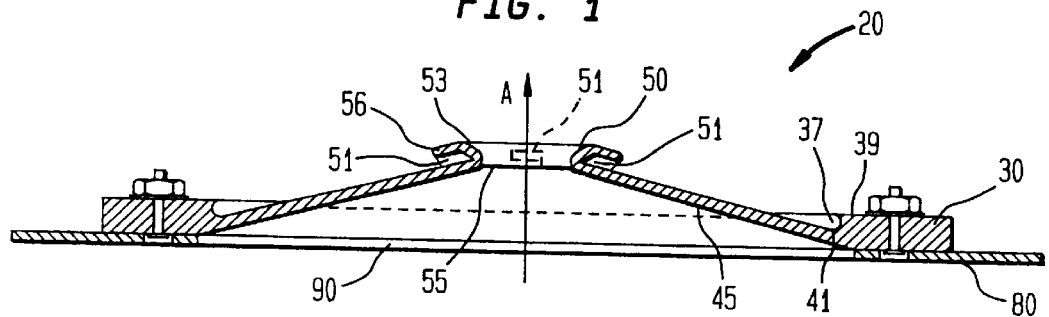
FIG. 1 is a front elevational sectional cutaway view of a bracket in accordance with the present invention.
Figure 3:
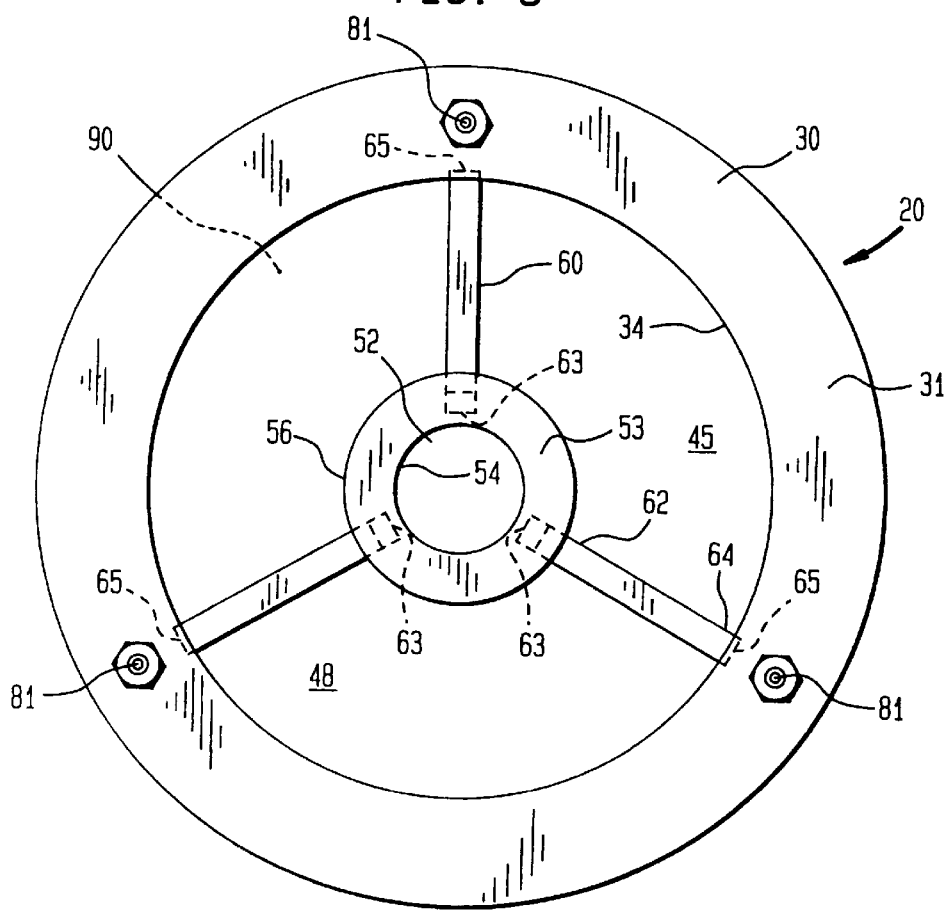
FIG. 3 is a top plan view of the bracket of FIG. 2, in accordance with the present invention.

With initial reference to FIGS. 1 and 3, there is depicted a mechanism, shown as a cable bracket 20, in accordance with a first embodiment of the present invention. Bracket 20 includes an outer mounting flange 30 for mounting bracket 20 to a surface 80 containing an orifice 90 through which a cable or other elongated body must be passed. Also included is an elastically deformable cable-retaining member shown as ring 50 for receiving therein the cable to be supported, and a connecting portion 45 for connecting flange 30 to ring 50. Flange 30, cable-retaining ring 50 and connecting portion 45 are preferably formed of an elastically deformable material, such as neoprene or rubber, or other art-recognized resilient, flexible material, and are preferably, although not necessarily, formed as an integral assembly. As further discussed herein, flange 30, ring 50 and connecting portion 45 may also be completely or partially coated with or formed of a fire-retardant material. Alternatively, flange 30 may be a stiffer, stronger material, such as plastic or metal, with ring 50 and connecting portion 45 connected thereto, in which case ring 50 may be a rubber or rubber-like ring, and connecting portion 45 may a resilient fire-retardant material, or rubber or plastic-coated with a fire-retardant material. In short, the specific materials selected are an application-specific matter of design choice for the person of skill in the art, utilizing the teachings of the invention herein.

As is shown in FIG. 3, flange 30 is preferably ring-shaped, as most apertures are round in cross section, although any appropriate shape may be chosen depending upon the application, aperture size and shape, and the cable or wire type being supported. Nor is it necessary for flange 30 to be a closed shape, it being necessary only that there be sufficient material to connect bracket 20 to a surface and provide a connection point for supporting portion 45 and/or arms 60. Thus, flange 30 may be configured, by way of non-limiting example, as a plurality of lugs at which bracket 20 is mounted to a surface and from which connecting portion 45 and/or arms 60 extend to ring 50.

Referring once again to FIGS. 1 through 3, flange 30 includes a bottom surface 32, a top surface 31, an outer surface 33, and an inner surface 34. Flange 30 also includes arm-receiving sockets 37 which are sized and shaped to receive arms 60 (described below). Preferably, although not necessarily, sockets 37 are equally radially spaced at 120 degree intervals about axis A (FIGS. 1 and 3), and include a socket top wall 39, a socket bottom wall 41, and a socket back wall 38 extending between socket top wall 39 and socket bottom wall 41.

Figure 2:
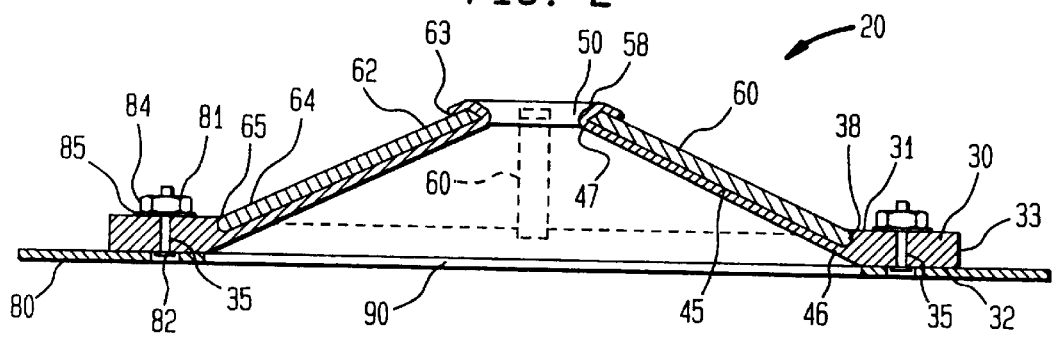
FIG. 2 is a front elevational sectional cutaway view of the bracket of FIG. 1 having arms inserted in accordance with one embodiment of the present invention.

As is shown in FIGS. 1 and 2, flange 30 includes throughholes 35 sized to accommodate a fastener 81. Preferably, throughholes 35 are radially aligned with sockets 37 and 51. When in use, flange 30 is mounted so as to surround an aperture 90 to be secured to a wall 80 via fasteners 81. Fastener 81 may consist of bolt 82, a nut 84, and a washer 85. However, it will be recognized from the teachings herein that flange 30 may be mounted to wall 80 in any manner known to those skilled in the art, such as, by way of non-limiting example, via snap fit, rivet, adhesive, or by forming threads in the bottom of the flange for screwing it into the orifice.

Figure 4:
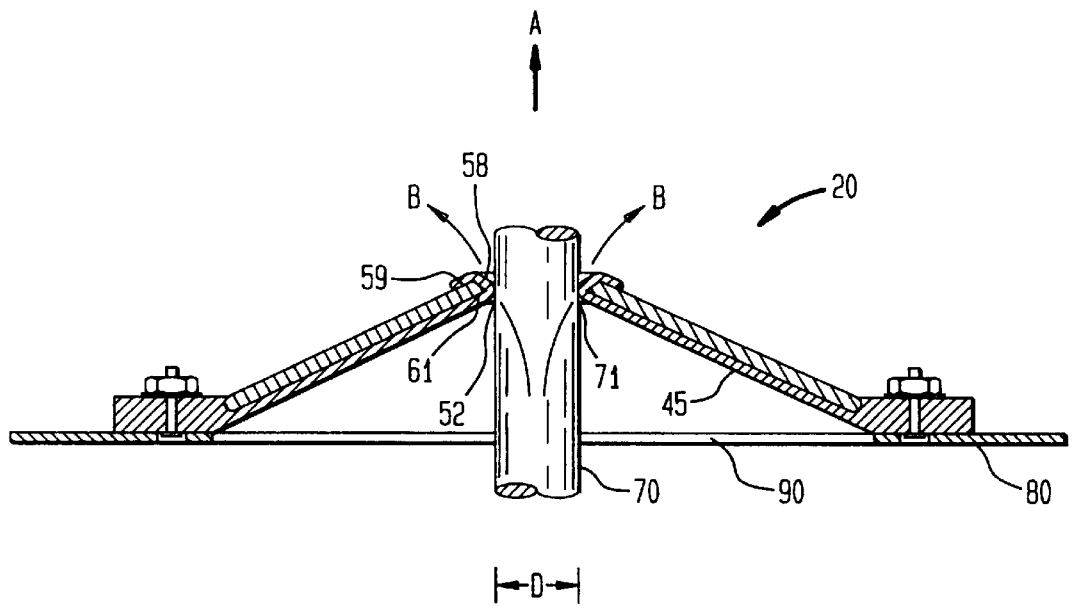
FIG. 4 is a front elevational sectional cutaway view of the bracket securing a relatively thin cable passing through an orifice.

With reference to FIGS. 3 and 4, ring 50 includes an opening 52 that is preferably sized slightly smaller than a cable 70 such that, when cable 70 passes through opening 52, inner surface 54 of ring 50 expands to conform with an outer surface 71 of cable 70. Because inner surface 54 flexibly conforms to cable 70, even if cable 70 is not perfectly circular, inner surface 54 and bottom surface 55 of ring 50 conform to outer surface 71 of cable 70 to form a seal. Thus, when provided with a fire-retardant the design of ring 50 obviates the need to wrap cable 70 in a fire-retardant material to fill a gap between cable 70 and inner surface 54 of ring 50. Instead, a fire-retardant seal is created simply by passing cable 70 through ring 50. As ring 50 is flexible and expandable, ring 50 can stretch and accommodate a variety of cable diameters, thus obviating the need for a wide variety of different size cable brackets.

Ring 50 includes a top surface 53, a bottom surface 55, an inner surface 54, and an outer surface 56. Ring 50 also includes arm-receiving sockets 51, which are sized and shaped to receive arms 60 (described below), and are preferably equally radially spaced about axis A. Ring sockets 51 are preferably positioned to oppose flange sockets 37. Sockets 51 include a top wall 59, a bottom wall 61, and a back wall 58 extending therebetween. Preferably, sockets 51 are located at the intersection of outer surface 56 and bottom surface 55 of ring 50.

Sockets 51 and 37 may be subjected to relatively heavy loads during the use of bracket 20. As such, ring 50 and flange 30 may also include reinforcing portions (not shown), for reinforcing sockets 51 and 37. Reinforcing portions may be integral with ring 50 or may be integral with connecting portion 45 (described below).

Referring to FIGS. 2 and 3, connecting portion 45 includes a proximal portion 46 and a distal portion 47. Connecting portion 45 preferably projects radially outward from outer surface 56 and bottom surface 55 of ring 50, and connects with flange 30 at inner surface 34. Connecting portion 45 is preferably integral with ring 50 and flange 30. However, it is recognized from the teachings herein that connecting portion 45 may be fastened or mounted to ring 50 and flange 30 in any manner known to those skilled in the art. Preferably, the material, and/or means of attaching connecting member 45 permits connecting portion 45 to flex in a direction shown as arrow B in FIG. 4. Alternatively, if connecting portion 45 is not formed of a flexible material, connecting portion 45 may be hinged at its point of connection with flange 30 and ring 50 to permit connecting portion 45 to pivot in the direction indicated by arrow B.

Proximal portion 46 and distal portion 47 may be reinforced their respective intersections with flange 30 and ring 50 by any means known to those skilled in the art. Ring socket 51 are preferably formed within ring 50 and proximal portion 46 of connecting portion 45, flange sockets 37 are preferably formed within flange 30 and distal portion 47 of connecting portion 45.

As is shown in FIG. 3, connecting portion 45 preferably includes a resilient membrane 48 that covers substantially all of the space between flange 30 and ring 50. In this manner, when bracket 20 is positioned over orifice 90, as is shown in FIG. 4, the entire orifice 90 is covered by bracket 20 making it unnecessary, once cable 70 is fed through opening 52, to take further steps to seal orifice 90. Thus, when provided with or formed of a fire-retardant material, the design of membrane 45 and ring 50 obviates the need to wrap cable 70 in a fire-retardant material to fill a gap between cable 70 and inner surface 54 of ring 50. Instead, a fire-retardant seal is created simply by passing cable 70 through ring 50. In the event that fire retardance, or complete sealing is not required, connecting portion 45 need not fill the entire space between flange 30 and ring 50.

Referring to FIGS. 2 and 3, arms 60 include distal portions 62, having distal walls 63, and proximal portions 64 having proximal walls 65, and are preferably sized and shaped to detachably engage with flange 30 and ring 50. Arms 60 may be formed of a plastic or metal or any other relatively rigid, non-flexible material having sufficient strength to withstand the anticipated force to be applied to cable 70, as a matter of design choice. Proximal portions 62 and distal portions 64 of arms 60 are shaped and sized to be retained within flange socket 37 and ring socket 51. Distal portions 62 of arms 60 are retainingly received by ring sockets 51 and proximal portions 64 of arms 60 are retainingly received by flange sockets 37.

While arms 60 are preferably separate, detachable elements, either proximal portions 64 or distal portions 62 of arms 60 may be fixedly attached to flange 30 or ring 50. By way of non-limiting example, proximal portions 62 of arms 60 may be hingedly attached to flange 30 such that distal portion 64 of arms 60 may be pivoted about proximal wall 63 and engaged in ring socket 37. Moreover, arms 60 may be integrally formed within connecting portion 45, as by molding stiff elongated rods within connecting portion 45. Or, arms 60 may fit into elongated troughs (not shown) in connecting portion 45. The exact methodology of attaching arms 60 to be positioned between ring 50 and flange 30 is an application specific matter of design choice.

Preferably, the distance between back walls 38 of flange sockets 37 and back walls 58 of ring sockets 51 is less than the length of arms 60, although that does not need to be the case. In this way, as is shown in FIG. 3, when arms 60 are received within sockets 37 and 51 connecting member 45 is stretched to accommodate arms 60, thereby placing connecting member 45 in a state of tension as is shown by FIG. 2. Thus, while cable 70 may be passed through ring 50 when arms 60 are positioned within sockets 37 and 51, cable 70 is more readily fed through ring 50 when arms 60 are not positioned in sockets 37 and 51, when connecting member 45 is in a relaxed state condition (as shown in FIG. 1).

As is discussed in more detail below, when arms 60 are seated within sockets 37 and 51, arms 60 permit cable 70 to pass through opening 52 of ring 50 in a first direction shown as arrow A in FIG. 5, but prevent cable 70 from passing in a direction substantially opposite to the first direction shown as arrow A'.

In an alternative embodiment, arms 60 may provide the sole means of connecting flange 30 to ring 50. In such an embodiment, arms 60 may be formed integrally with flange 30 and ring 50 or be attached in any manner known to those skilled in the art. In such an embodiment, arms 60 may contain a cut-out region for housing a stiffening member (not shown). As will be readily recognized by those persons skilled in the art who utilize the teachings herein, arms 60 may be configured in any number of ways to perform the desired result of permitting cable 70 to pass through ring opening 52 in one direction while preventing cable 70 form being withdrawn from ring opening 52.

As will be readily recognized by the person of skill in the art utilizing the teachings herein, the various shapes and dimensions described herein are exemplary and may be readily modified and adapted to suit a wide variety of sizes and shapes. Thus, a wide variety of shapes are contemplated and readily realized, making bracket 20 particularly suited to mass production, as well as customization. Nonetheless, the specific dimensions by which any particular application is satisfied are a matter of application-specific design choice.

Further, while this invention is generally described in relation to cables secured to housings, it is readily apparent to those skilled in the art that this invention may be applied to any structure through which a single- or multi-conductor cable, wire, rope, conduit, hose, or other elongate object must pass and/or be secured, and the term "cable" is used for the sake of convenience, it being intended that the term cable is defined herein to include all such elongate objects.

Figure 5:
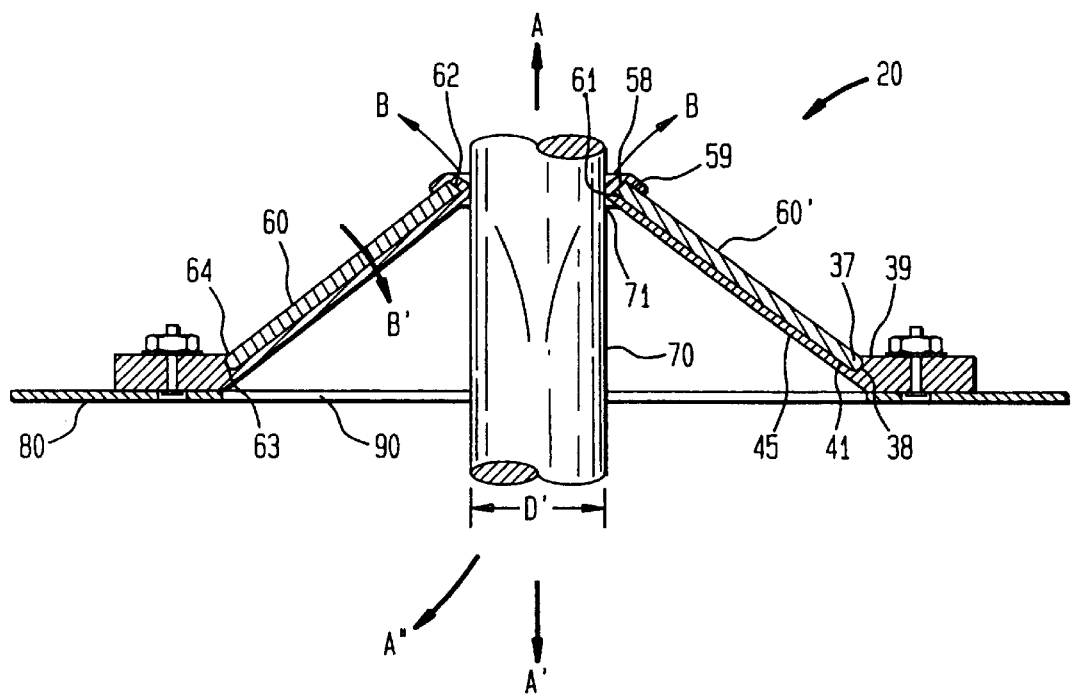
FIG. 5 is a front elevational sectional cutaway view of the bracket securing a relatively thick cable passing through an orifice.

Referring to FIGS. 4 and 5, a method of securing cable 70 passing through orifice 90 in wall 80 using bracket 20 is depicted. Bracket portion 20 is positioned over and about orifice 90 such that ring 50 is more distal from wall 80 than flange 30, and opening 52 of ring 50 is substantially concentric with orifice 90. Flange 30 is then connected to wall 80 using fasteners 81.

Next, as is shown in FIG. 4, cable 70 having a diameter D is passed through orifice 90 and through ring opening 52 in a first direction indicated by arrow A. As cable 70 passes through ring opening 52, ring opening 52 stretches to accommodate cable 70, such that inner surface 54 of ring 50 conformingly engages with outer surface 71 of cable 70 to form a seal. Because ring 50 consists of an elastically deformable material, even if surface 71 of cable 70 is irregular (i.e., not perfectly circular) ring 50 deforms to surround and seal against surface 71. Depending upon the diameter of cable 70, ring opening 52 stretches more or less to accommodate cable 70.

Where, as is shown in FIGS. 4 and 5, arms 60 are detachably engaged with ring 50 and flange 30, arms 60 may be positioned within sockets 37 and 51 prior to or after cable 70 is passed through opening 52. Where arms 60 are positioned within sockets 31 and 51 prior to cable 70 being fed through opening 52, as cable 70 passes through ring opening 52, arms 60 pivot about flange socket 37 in a direction indicated by arrows B. Similarly, connecting portions 45, which, in the embodiment depicted in FIGS. 4 and 5, house arms 60, pivot about a point where proximal portion 46 of connecting member 45 meets inner surface 34 of flange 30. In this manner, arms 60 and connecting portions 45 remain positioned between flange 30 and ring 50. As cable 70 passes through opening 52, cable 70 applies a force to inner surface 54 of ring 50 which causes arms 60 and connecting portions 45 to pivot outwardly from axis A in the direction indicated by arrows B. Because sockets 37 and 51 are formed within elastically deformable ring 50, as arms 60 pivot, sockets 37 and 51 also pivot to maintain arms 60 within sockets 37 and 51.

As shown in FIG. 5, where a diameter D' of cable 70 is greater than that shown in FIG. 4, opening 52 further stretches to accommodate cable 70 thereby causing arms 60 to further pivot in the direction indicated by arrows B. Thus, because arms 60 are free to pivot about sockets 37 and 51 to maintain the integrity of bracket 20, cables having a wide range of diameters may be accommodated by ring 50.

In an embodiment in which connecting portion 45 includes fire-retardant membrane 48 (FIG. 3) that covers the entire space between flange 30 and ring 50, bracket 20 provides a means of sealing a housing such as a building entrance protector for compliance with local fire code safety standards. In this manner, if a fire or smoke condition were to occur within the structure having orifice 90, such fire or smoke condition would be contained within the structure.

After cable 70 has been fed through opening 52 and arms 60 have been positioned within bracket 20, bracket 20 acts to strain-relief cable 70. As such, as is shown in FIG. 5, if a force is applied to cable 70 in a direction indicated by arrow A', cable 70 will attempt to move in the direction indicated by arrow A'. At this time, arms 60 pivot in a direction B', substantially opposite to the direction indicated by arrow B. Because distal end 62 of arms 60 are seated within top walls 59, bottom walls 61 and back walls 58 of sockets 51 and proximal ends 64 are seated within top walls 59, bottom walls 61 and back walls 38 of socket 37, when arms 60 attempt to pivot in a direction indicated by arrow B', proximal walls 65 of arms 60 abut against back walls 38, and distal walls 63 of arms 60 abut against back walls 58. As a force is applied in the direction indicated by A', each arm 60 pivots in the direction indicated by B', until it compresses ring 50 against cable surface 71, thereby preventing cable 70 from being withdrawn from opening 52. Where a force is applied in a direction indicated by A", one arm 60' may pivot toward cable 70 prior to the remainder of arms 60, however, once ring 50 is sufficiently compressed by arm 60', the remainder of arms 60 will pivot in reaction to the component of force applied in direction A' of the force applied in direction A". In short, because of the kinematic design of the present invention, regardless of the direction of the force applied, bracket 20 will act to strain relieve cable 70 through the compressive force applied by arms 60.

Thus, with arms 60 installed, bracket 20 provides a unidirectional clamp. Bracket 20 permits cable 70 to pass through ring opening 52 in a first direction, while preventing cable 70 from being withdrawn in a direction substantially opposite the first direction. Further, when a force is applied to cable 70, the force is distributed evenly among arms 60 as arms 60 are equally radially spaced about ring 50.

With arms 60 not installed, the clamp permits passage through the clamp in either direction A or A' (or A"), thus permitting ease of installation. For example, cable 70 may be pulled through clamp 20 a first amount, while being protected from contact with the edges of orifice 90 by ring 50. If too much cable has been pulled through, the cable may be pulled out a desired amount until the desired position of cable is achieved. Only then are arms 60 inserted to strain relieve the cable.

Preferably, throughholes 35 of flange 30 are arranged such that fasteners 81 are radially aligned with arms 60 so that fastener 81 may act to counter the movement applied to flange 30 by proximal ends 64 of arms 60 when a force is applied to cable 70.

In this manner, a method of securing a cable to a surface is provided that does not require cable 70 to be clamped to wall 80, thereby simplifying the assembly process. As such, the likelihood of damaging cable 70 during the installation process is minimized. Also, because ring opening 52 is preferably positioned concentrically in relation to 90, cable 70 is passed through orifice 90 at a location where cable 70 is less likely to contact wall 80, thereby once again minimizing cable damage. Most importantly, arms 60 of bracket 20 serve to strain-relieve cable 70 so that, when cable 70 is subjected to a force, wires that are broken out from cable 70 and terminated within a structure are not pulled from their termination points. In addition, by providing flexible ring 50, bracket 20 may accommodate cables of varying diameters. This greatly increases installation flexibility, as one bracket may be provided for an entire range of cable diameters.

Figure 6:
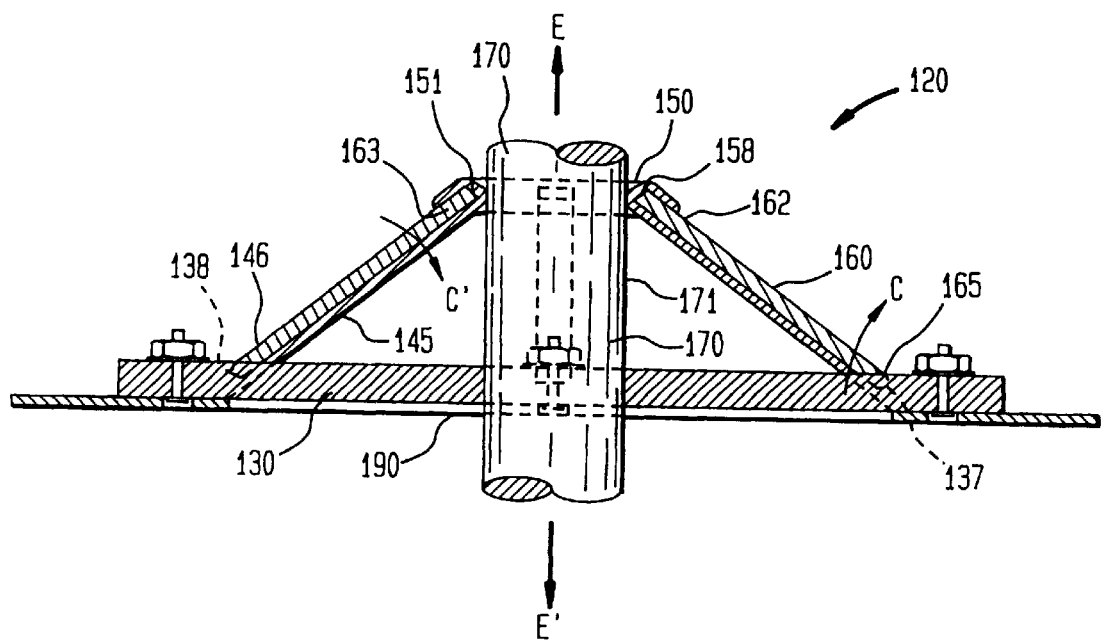
FIG. 6 is a front elevational sectional cutaway view of a bracket assembled to secure a cable passing through an orifice in accordance with an alternate embodiment of the present invention.
Figure 7:
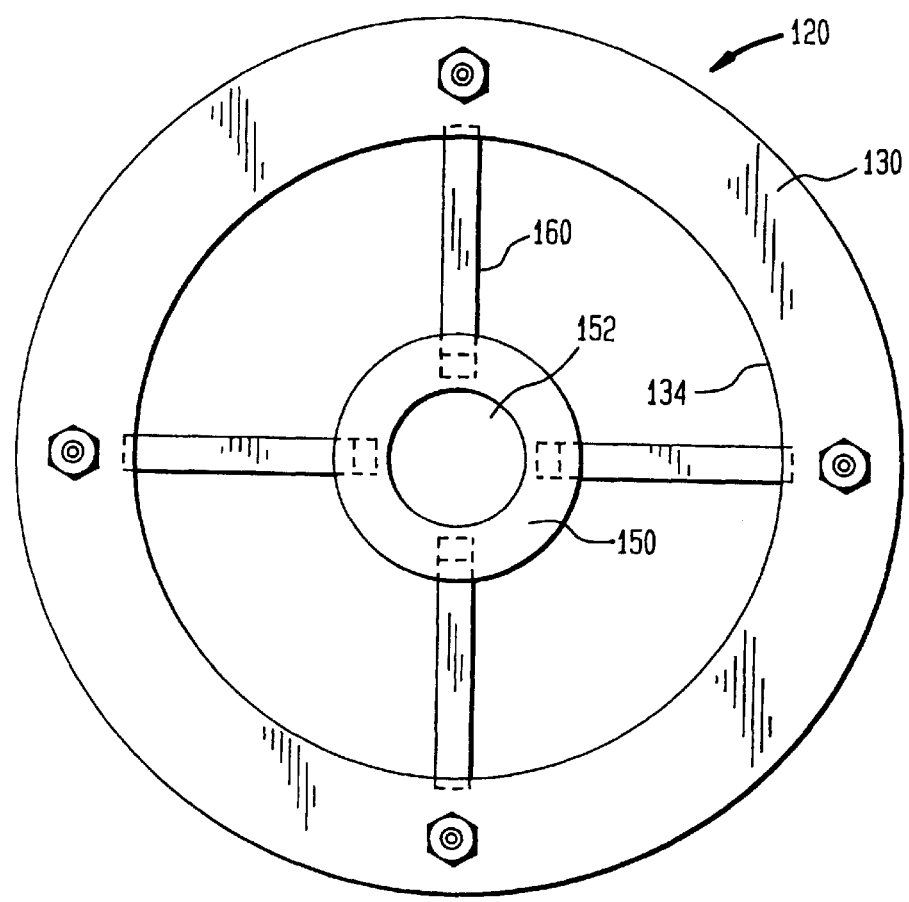
FIG. 7 is a top plan view of the bracket of FIG. 6.

Referring to FIGS. 6 and 7, a bracket 120 constructed in accordance with a second embodiment of the present invention is depicted. Bracket 120 is constructed similarly to bracket 20, and, as such, similar elements are similarly referenced. The primary difference is that rather than having three arms 60 as shown in FIGS. 1–3, bracket 120 includes four arms 160 displaced 90 degrees apart. In all other pertinent respects, as is described below, bracket 120 performs similarly to bracket 20.

Referring to FIGS. 6 and 7, a method of securing cable 170 passing through an orifice 190 using bracket 120 is depicted. When cable 170 passes through ring opening 152, arms 160 pivot about flange socket 137 through an angle indicated by arrow C. Connecting portions 145, which, in the embodiment depicted, house arms 160, pivot about a point where proximal portion 146 meets inner surface 134 of flange 130. In this manner, arms 160 and connecting portions 145 remain positioned between flange 130 and ring 150 and housed within connecting portion 145 when cable 170 passes through opening 152. However, under a force applied in a direction indicated by arrow E, ring 150 is stretched to permit cable 170 to pass through opening 152, and arms 160 and connecting portions 145 pivot outwardly through an angle indicated by arrow C.

When a force is applied to cable 170 in a direction indicated by arrow E, cable 170 will attempt to move in that direction. At this time, arms 160 pivot in a direction indicated by arrow C', which is substantially opposite to the direction indicated by arrow C. Because arms 160 are seated within sockets 151 and sockets 137, when arms 160 attempt to pivot in a direction indicated by arrow C', proximal walls 165 of arms 160 abut against back walls 138, and distal walls 163 of arms 160 abut against back walls 158. As a force is applied in the direction indicated by E', each arm 160 pivots in the direction indicated by C', until it compresses ring 150 against cable surface 171, thereby preventing cable 170 from being withdrawn from opening 152.

As described above, bracket 120 differs from the first embodiment only in that four arms 160 are provided rather than the three arms 60 of bracket 20. As such, bracket 120 provides one more point where compression is applied to cable 170 when cable 170 attempts to move in a direction indicated by E' (FIG. 6). Therefore, assuming similar construction and materials, bracket 120 is capable of strain-relieving a larger force applied to withdraw cable 170. As such, where the cable is expected to encounter larger forces, it is further contemplated that brackets may be constructed with more than three equally radially spaced arms.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An apparatus for guiding and securing a cable passing through an orifice in a structure, comprising:
   a mounting flange for mounting said apparatus to said structure;
   a cable retaining member for engaging the cable passing through said member; and
   a plurality of arms extending between and connected to said mounting flange and said cable retaining member for permitting passage of the cable through said cable retaining member in a first direction and for preventing passage of the cable in a direction substantially opposite said first direction, wherein said arms are pivotable about said mounting flange for selectively permitting and preventing passage of the cable.

2. The apparatus of claim 1, wherein said cable retaining member is substantially annular.

3. The apparatus of claim 2, wherein said cable retaining member is elastically deformable for conformingly engaging an outer surface of the cable passing therethrough.

4. The apparatus of claim 1, comprising a connecting portion for connecting said mounting flange and said cable retaining member.

5. The apparatus of claim 4, wherein said connecting portion is a resilient membrane.

6. The apparatus of claim 5, wherein said membrane completely fills a space between said flange and said member.

7. The apparatus of claim 6, wherein said membrane comprises a fire-retardant material.

8. The apparatus of claim 6, wherein said apparatus is formed of a fire-retardant material.

9. The apparatus of claim 4, wherein said connecting portion assumes a frustro-conical shape when the cable passes through said cable retaining member.

10. The apparatus of claim 4, wherein said connecting portion is shaped and sized to support at least a lower surface of each of said plural arms.

11. The apparatus of claim 1, wherein said mounting flange and said cable retaining member each include arm-receiving sockets for insertion therein of said plural arms.

12. The apparatus of claim 11, further comprising a connecting portion for connecting said mounting flange and said cable retaining member, where said connecting portion is shaped and sized to support at least a lower surface of each of said plural arms.

13. The apparatus of claim 1, wherein said plurality of arms comprises at least three arms equally spaced radially about said cable retaining member.

14. A method of securing a cable passing through an orifice in a structure, comprising the steps of:
(a) mounting to said structure and over said orifice a bracket having a mounting flange, an elastically deformable, cable-retaining member having an opening, and at least three arms for connecting said mounting flange to said cable-retaining member, said arms extending between said mounting flange and said cable-retaining member and being pivotable about said mounting flange; and
(b) passing said cable through said orifice and said opening of said cable-retaining member in a first direction such that said opening conforms to said surface of said cable with said arms pivoting.

15. A method of securing a cable passing through an orifice in a structure, comprising the steps of:
(a) mounting to said structure and over said orifice a bracket having an outer mounting flange, an elastically deformable, cable-retaining member having an opening, and a connecting portion for connecting said mounting flange to said cable-retaining member;
(b) passing said cable through said orifice and said opening of said cable-retaining member such that said opening conforms to said surface of said cable and permits the passage of said cable in a first direction and a second direction substantially opposite to said first direction;
(c) attaching a plurality of elongated, relatively inflexible arms between said flange and said member so as to permit the passage of said cable in said first direction while preventing the passage of said cable in said second direction.

16. The method of claim 15, wherein said bracket includes arm-receiving sockets, and said step of attaching said plurality of arms is carried out by inserting said plural arms in said arm-receiving sockets.

17. A method of mounting a mechanism for securing and strain relieving a cable, comprising the steps of:
(a) providing a structure having an orifice formed on a surface; and
(b) mounting said structure and over said orifice a bracket having a mounting flange, an elastically deformable, cable-retaining member having an opening, and at least three elongated arms extending between and connected to said mounting flange and said cable retaining member for positioning said member along a first plane that is substantially parallel to a second lying co-extensively with said surface and said flange, said first plane not intersecting said second plane when so positioned by said arms.

18. A strain relief comprising:
a mounting flange;
a cable-retaining member having an opening; and
at least three elongated arms extending between and connected to said mounting flange and said cable retaining member for positioning said member along a first plane that is substantially parallel to a second plane lying co-extensively with said surface and said flange, said first plane not intersecting said second plane when said member is positioned by said arms.

19. An apparatus for guiding and securing a cable passing through an orifice in a structure, comprising:
a mounting flange for mounting said apparatus to said structure;
a cable retaining member for engaging a cable passing through said member; and
a plurality of arms connected between said mounting flange and said cable retaining member for permitting passage of a cable through said cable retaining member in a first direction and for preventing passage of the cable in a direction substantially opposite said first direction, wherein said mounting flange and said cable retaining member each include arm-receiving socket for insertion thereon of said plural arms.

20. The apparatus of claim 19, further comprising a connecting portion for connecting said mounting flange and said cable retaining member, where said connecting portion is shaped and sized to support at least a lower surface of each of said plural arms.

* * * * *